United States Patent
Kornilovich (10) Patent No.: US 12,377,416 B2
(45) Date of Patent: Aug. 5, 2025

(54) REVERSIBLE MICRO-VALVE DEVICES

(71) Applicant: Hewlett-Packard Development Company, L.P., Spring, TX (US)

(72) Inventor: Pavel Kornilovich, Corvallis, OR (US)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 87 days.

(21) Appl. No.: 18/030,749

(22) PCT Filed: Oct. 9, 2020

(86) PCT No.: PCT/US2020/054957
§ 371 (c)(1),
(2) Date: Apr. 6, 2023

(87) PCT Pub. No.: WO2022/075997
PCT Pub. Date: Apr. 20, 2022

(65) Prior Publication Data
US 2023/0383866 A1 Nov. 30, 2023

(51) Int. Cl.
*B01L 3/00* (2006.01)
*F16K 99/00* (2006.01)

(52) U.S. Cl.
CPC ..... *B01L 3/502784* (2013.01); *B01L 3/50273* (2013.01); *F16K 99/0019* (2013.01);
(Continued)

(58) Field of Classification Search
CPC ........... B01L 3/502784; B01L 3/50273; B01L 2200/0673; B01L 2200/0689;
(Continued)

(56) References Cited

U.S. PATENT DOCUMENTS 8,037,903 B2    10/2011    Wang et al.
2003/0234210 A1*  12/2003    Deshpande ......... F16K 99/0028
                                                209/581

(Continued)

FOREIGN PATENT DOCUMENTS

CN    201884767 U    6/2011
WO    99/39120 A1    8/1999

OTHER PUBLICATIONS

Barman, U., et al., "Capillary Microvalve Actuation Using Thermal Expansion of Trapped Air Bubble", MDPI, Proceedings, vol. 2, 1031, Nov. 16, 2018, pp. 5.

*Primary Examiner* — Minh Q Le
(74) *Attorney, Agent, or Firm* — Foley & Lardner LLP (57) ABSTRACT

A reversible micro-valve device includes a main channel, a passage comprising an opening in fluid communication with the main channel, and a side chamber to house a volume of trapped gas. The side chamber is communicably attached to the passage to control flow along the main channel. The side chamber is to be larger in volume than the main channel to which the trapped gas expands and includes one of the following two states at a given time: an open state in which the main channel is open and flow proceeds through the main channel, or a closed state in which the trapped gas within the side chamber is to expand within the passage and block the flow in the main channel.

16 Claims, 8 Drawing Sheets

(52) U.S. Cl.
CPC .............. *B01L 2200/0673* (2013.01); *B01L 2200/0689* (2013.01); *B01L 2300/0816* (2013.01); *B01L 2400/0442* (2013.01); *B01L 2400/0688* (2013.01); *B01L 2400/084* (2013.01)

(58) Field of Classification Search
CPC ..... B01L 2300/0816; B01L 2400/0442; B01L 2400/0688; B01L 2400/084; F16K 99/0019
USPC ........................................ 137/828, 874, 885
See application file for complete search history.

(56) References Cited

U.S. PATENT DOCUMENTS

| | | | | |
|---|---|---|---|---|
| 2004/0219732 | A1* | 11/2004 | Burns | B01F 33/30 438/200 |
| 2005/0217743 | A1* | 10/2005 | Bohm | A61B 5/150946 137/828 |
| 2005/0220629 | A1* | 10/2005 | Bohm | B01L 3/502784 417/505 |
| 2006/0094119 | A1* | 5/2006 | Ismagilov | B01J 19/0046 436/55 |
| 2007/0227592 | A1 | 10/2007 | Allen et al. | |
| 2008/0254468 | A1 | 10/2008 | Glauser | |
| 2008/0268544 | A1 | 10/2008 | Whalen | |
| 2009/0220948 | A1 | 9/2009 | Oviso et al. | |
| 2010/0051124 | A1* | 3/2010 | Imran | B01L 3/502715 137/565.11 |
| 2010/0260626 | A1* | 10/2010 | Fajolle | B01L 3/502769 417/413.2 |
| 2013/0206250 | A1* | 8/2013 | Zhang | F16K 99/0044 137/237 |
| 2015/0142186 | A1 | 5/2015 | Handique et al. | |
| 2016/0318015 | A1* | 11/2016 | Kornilovich | B41J 2/14201 |
| 2016/0367989 | A1* | 12/2016 | Huerre | F16K 99/0026 |
| 2018/0221875 | A1* | 8/2018 | Glauser | B01L 3/502715 |
| 2019/0060898 | A1 | 2/2019 | Mourey et al. | |
| 2020/0173581 | A1 | 6/2020 | Olbrich et al. | |
| 2021/0402394 | A1* | 12/2021 | Sievers-Engler | B01L 3/502715 |
| 2023/0013681 | A1* | 1/2023 | Jones | B01L 3/50273 |
| 2023/0035535 | A1* | 2/2023 | Kornilovich | F16K 99/0019 |
| 2024/0009667 | A1* | 1/2024 | Shimizu | B01L 3/50273 |

\* cited by examiner

REVERSIBLE MICRO-VALVE DEVICES

CROSS-REFERENCE TO RELATED APPLICATIONS

This application is filed under 35 U.S.C. § 371 as a National Stage of PCT International Application No. PCT/US2020/054957, filed Oct. 9, 2020, which is incorporated by reference herein in its entirety.

BACKGROUND

Microfluidic systems are used to perform different operations on small volumes of fluid. For example, microfluidic systems can move, mix, separate, and perform fluid analysis of different types of fluids. Such systems can be used in the medical industry, for example to analyze DNA, detect pathogens, perform clinical diagnostic testing, and aiding in synthetic chemistry. Such microfluidic systems may also be used in other industries.

BRIEF DESCRIPTION OF THE DRAWINGS

The accompanying drawings illustrate various implementations of the principles described herein and are a part of the specification. The illustrated implementations are merely examples and do not limit the scope of the claims.

Throughout the drawings, identical reference numbers designate similar, but not necessarily identical, elements.

DETAILED DESCRIPTION

In the following description, for purposes of explanation, specific details are set forth in order to provide a thorough understanding of the disclosure. It will be apparent, however, to one skilled in the art that examples consistent with the present disclosure may be practiced without these specific details. Reference in the specification to "an implementation," "an example" or similar language means that a particular feature, structure, or characteristic described in connection with the implementation or example is included in at least that one implementation, but not necessarily in other implementations. The various instances of the phrase "in one implementation" or similar phrases in various places in the specification are not necessarily all referring to the same implementation.

The micro-valve is an element that is used in microfluidic systems. Together with the micro-pump that is used for inertial push and ejection pull or other components, the micro-valve enables fluidic routing through microfluidic systems devices. While the micropump generates driving pressure differences, the micro-valve opens and closes flow in different parts of the microfluidic system, thus forming a flow pattern for device operation. If valves are reversible, the flow pattern may be changed by a system controller according to how it is programmed, thereby providing unlimited design flexibility.

Other fluid valves may have mechanical parts or otherwise involve moving parts. As such, they do not scale well to micro-scale defined by characteristic dimensions between 1 and 500 micrometers (μm). Small moving parts are difficult to fabricate and control. During operation, they may get stuck due to random mechanical, interfacial, and electrostatic forces and are therefore unreliable. While micro-valves have undoubtedly advanced microfluidic systems, some developments may enhance their utility.

Accordingly, a reversible micro-fluidic device is described that has a working principle based on thermal expansion and contraction of air bubbles due to temperature changes. A reversible micro-fluidic system includes a series of dead-end side chambers that trap gas when the system is primed with fluid. After priming, the die temperature is raised which causes the gas to expand into the main channel and block the flow. If the temperature is lowered, the bubble is sucked back into the side chamber and flow in the main channel resumes. A system of capillary breaks helps stabilize the menisci at fixed locations in both open and closed states. Such a device may be fabricated on a single die in large quantities.

In an example, the reversible micro-valve device includes a main channel, a passage that includes an opening in fluid communication with the main channel, and a side chamber to house a volume of trapped gas. The side chamber is communicably attached to the passage to control flow along the main channel. The side chamber is to be larger in volume than the main channel to which the trapped gas expands. The micro-valve device has at least the following two states at a given time 1) an open state in which the main channel is open and flow proceeds through the main channel, or 2) a closed state in which the trapped gas within the side chamber is to expand within the passage and block the flow in the main channel.

In an example of the reversible micro-valve device, the main channel and passage form a T-shape with the main channel perpendicular to the passage.

In an example, the reversible micro-valve device includes at least one capillary break.

In an example, the reversible micro-valve device includes at least one capillary break in the main channel.

In an example, the reversible micro-valve device includes a heating device communicably attached to the side chamber.

In an example, the main channel includes at least two valves that are each communicatively attached to the side chamber. Flow going through each passage of each of the at least two valves is stopped in each passage as controlled by the trapped gas in the side chamber.

In an example, the passage directs gas expansion perpendicular to the flow through the main channel.

In an example, the trapped gas in the side chamber is air.

In an example, an internal valve width is less than an internal width of the main channel width.

In an example, the reversible micro-valve system includes a plurality of channels, and a side chamber to house a volume of trapped gas. The side chamber is communicably attached by passages to respective channels of the plurality of channels to control flow therein. Also, the side chamber is to be larger in volume than each channel of the plurality of channels into which the trapped gas expands. The reversible micro-valve system further includes a heating device communicably attached to the side chamber. The reversible micro-valve device has at least the following two states at a given time 1) an open state in which the plurality of channels are open and flow proceeds through the plurality of channels, or 2) a closed state in which the trapped gas within the side chamber is to expand within the passage and block the flow in the plurality of channels. In an example of the reversible micro-valve system, the trapped gas in the side chamber is air.

In an example, the reversible micro-valve system includes a different temperature that is used to activate different valves of the side chamber for the respective plurality of channels. In other words, different valves that have different valve volumes or other structure have different temperatures to close off respective channels of the plurality of channels. A first temperature may be used to close a first valve to stop flow, however the first temperature may be selected so that it does not affect a second valve that is adjacent to the first valve because the second valve requires a higher temperature in order to trap gas and close the second valve. In this manner, flow stops at the closed first valve and the second valve remains open. However, the flow through the second valve is drained and empty since the flow is not replenished from the first valve. In another example, two valves may be closed by a first temperature while a third valve in between the two valves remains open. In this manner, a fluid may be trapped between the two closed valves.

In an example, the reversible micro-valve system includes a an internal width of the side chamber that is equal to or less than an internal width of each channel of the plurality of channels.

In an example of the reversible micro-valve system, the side chamber includes a volumetric shape that is to encompass at least partially unused space within a device that incorporates the thermo-pneumatic micro-valve system.

A method for controlling flow is also described. According to the method, 1) a first temperature is applied to a side chamber of a valve that is in fluid communication with a main channel. When the first temperature is applied, flow proceeds through the main channel while the side volume contains trapped gas. The volume of the side chamber is larger than the volume of the work volume, which encompasses the volume of the passage and a portion of the main channel. Also, according to the method, 2) a second temperature is applied to the side chamber, the second temperature being higher than the first temperature. The second temperature causes the trapped gas within the side chamber to expand into the main channel to block the flow of fluid through the main channel.

An example of the method further includes the diversion of at least a portion of fluid flow away from the main channel via an off-branch channel in fluid communication with the main channel and passage. The off-branch fluid diversion stops when the trapped gas in the side chamber expands.

Figure 1:
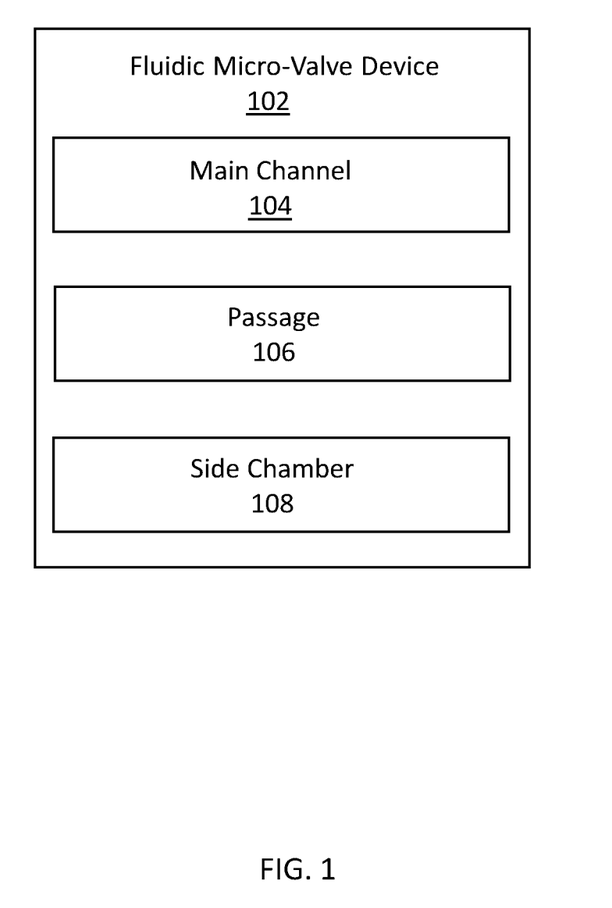
FIG. 1 is a block diagram of a reversible micro-valve device, consistent with the disclosed implementations.

Turning to FIG. 1, a reversible micro-valve device 102 is shown that includes a main channel 104, passage 106, and side chamber 108. The main channel 104 is the main passage through which fluid flows. The side chamber 108 is communicably attached to the passage 106 to control the flow along the main channel 104. Specifically, trapped gas in the side chamber 108 expands, upon heating, to block the fluid flow through the main channel 104. As the temperature is reduced, the trapped gas retracts into the side chamber 108 and fluid flow through the main channel 104 resumes. The side chamber 108 is larger in volume than the main channel 104 into which the trapped gas expands. The reversible micro-valve device 102 has at least the following two states 1) an open state in which the main channel 104 is open and flow proceeds through the main channel, and 2) a closed state in which the trapped gas within the side chamber 108 expands within the passage 106 and blocks the flow in the main channel 104.

Figure 2:
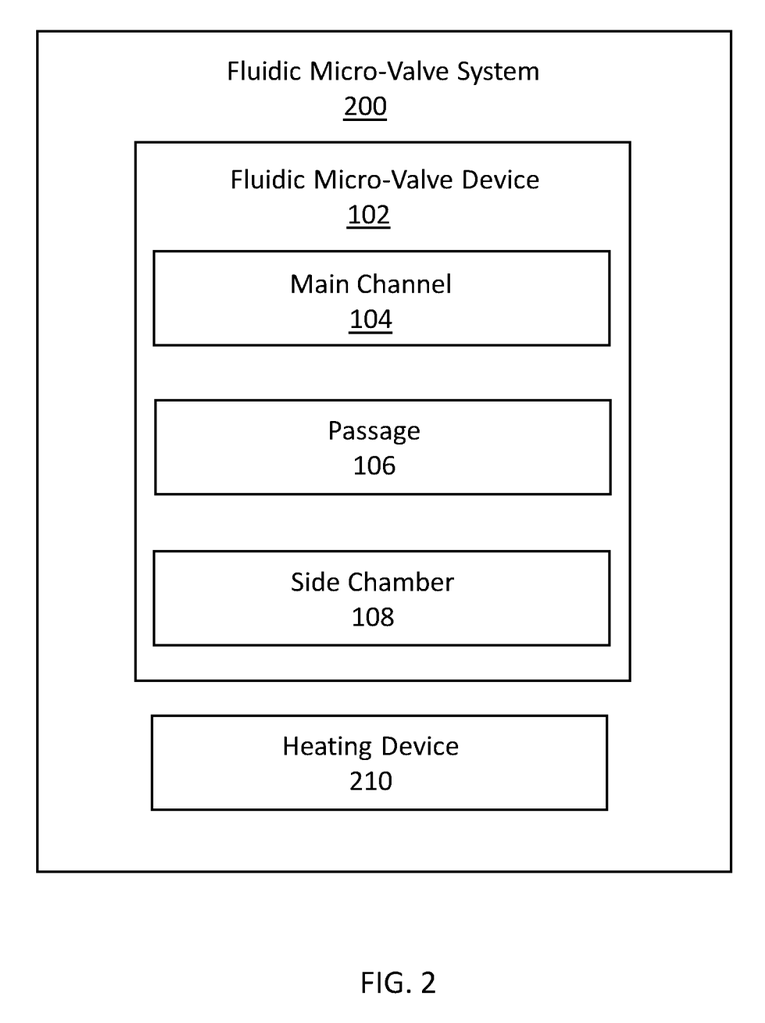
FIG. 2 is a block diagram of a reversible micro-valve system, consistent with the disclosed implementations.

Turning to FIG. 2, a reversible micro-valve system 200 is shown according to principles described herein. The reversible micro-valve system 200 includes a reversible micro-valve device 102 that includes a main channel 104, passage 106, and side chamber 108. The reversible micro-valve system 200 further includes a heating device 210 communicably attached to the side chamber 108. The heating device 110 may include any type of heating device that is used to heat the fluid. Examples include thermal inkjet resistors and power field effect transistors. In addition to the side chamber 108, a heating device 110 may be attached to the passage 106, main channel 104, and other components in a fluidic system.

Figure 3:
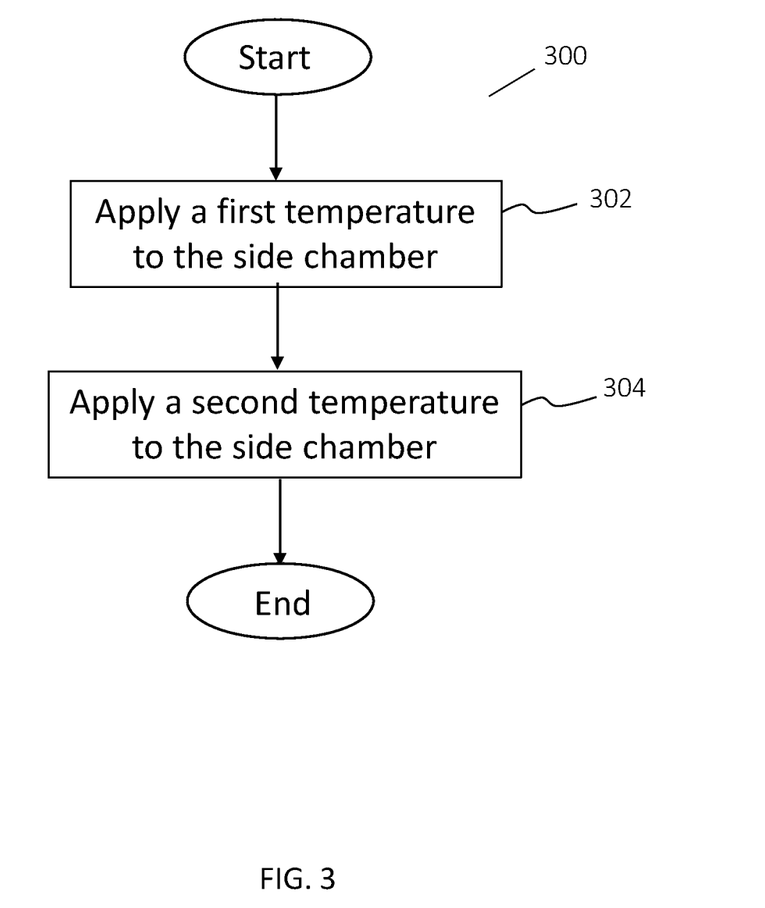
FIG. 3 is a flowchart illustrating a method for regulating flow with a fluidic micro-valve system, consistent with the disclosed implementations.

FIG. 3 depicts a method 300 for controlling flow in a reversible micro-valve device. The method 300 includes applying 302 a first temperature to a side chamber 108 of a micro-valve that is in fluid communication with a main channel 104. When the first temperature is applied, flow proceeds through the main channel 104 while the side chamber 108 contains trapped gas. The volume of the side chamber 108 is larger than the work volume which encompasses the volume of the passage 106 and a portion of the main channel 104 into which the trapped gas expands. The method 300 further includes applying 304, to the side chamber 108, a second temperature that is higher than the first temperature. The second temperature causes the trapped gas within the side chamber 108 to expand into the portion of the main channel 104 to block the flow of fluid through the main channel 104.

In an example, the reversible micro-valve device 102 of the present specification is of a thermo-pneumatic type, according to principles discussed herein. In other words, the working principle is that a gas, such as air, is trapped in an enclosed volume within a side chamber 108. When temperature is elevated, the air expands; when temperature is lowered the air contracts. Volume changes can be estimated from the ideal gas law where: air volume is approximately proportional to the (absolute) temperature. For example, increasing die temperature (and the temperature of the trapped air) from room temperature of 27 Celsius (C) (=300 Kelvin (K)) to 57 C (330 K), increases the air volume by approximately 10%.

FIGS. 4a, 4b, 4c, and 4d depict various examples of the micro-valve 102 which includes the main channel 104, side chamber 108, and passage 106. The main channel 104 is an elongate member with a hollow therethrough to allow flow of fluid. The side chamber 108 is an enclosure with trapped gas, such as air, that has no vents or ports. A passage 106 is a channel that connects the side chamber 108 to the main channel 104 and is in fluid communication with both the passage 106 and the main channel 104. In another example, the passage 106 is an opening between the side chamber 108 and the main channel 104. In another example, the passage 106 and the side chamber 108 are combined as one element.

Figure 4A:
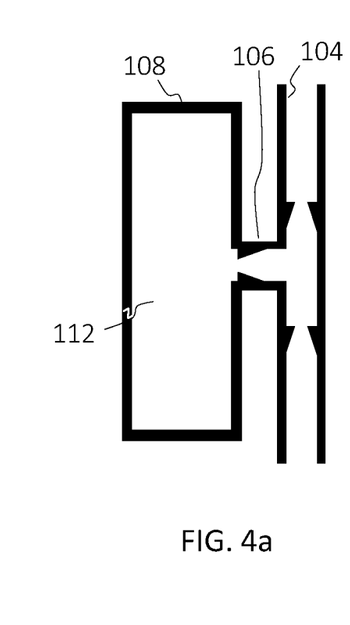
FIG. 4a is a reversible micro-valve device, consistent with the disclosed implementations.
Figures 4B, 4C:
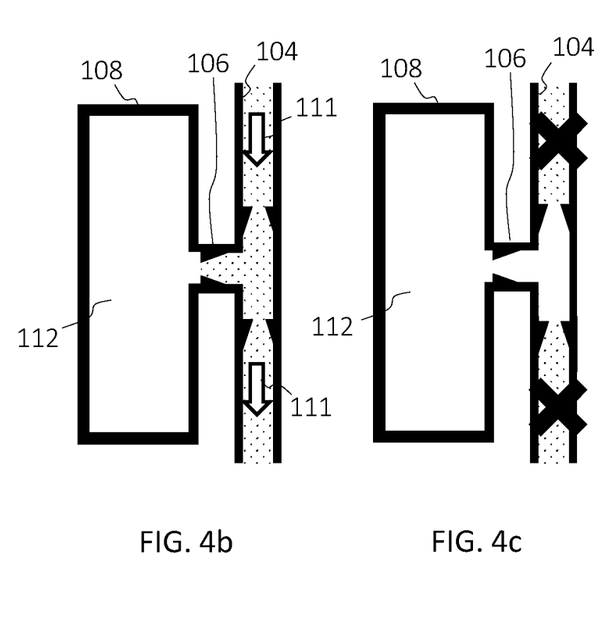
FIG. 4b is a reversible micro-valve device, consistent with the disclosed implementations.
FIG. 4c is a reversible micro-valve device, consistent with the disclosed implementations.
Figure 4D:
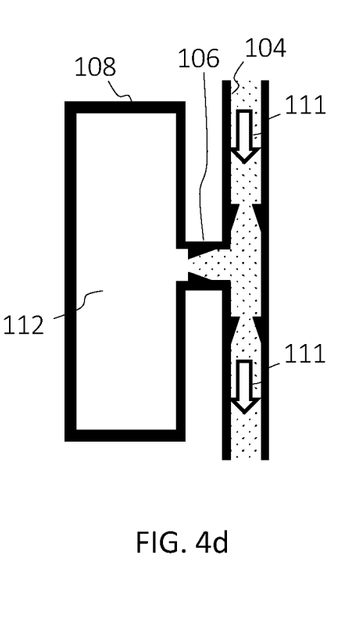
FIG. 4d is a reversible micro-valve device, consistent with the disclosed implementations.

FIG. 4a illustrates the reversible micro-valve device 102 in a state in which there is no flow. FIG. 4b illustrates the reversible micro-valve device 102 at a first temperature in which fluid 111 flows (as indicated by arrows) through the main channel 104 or is otherwise present within the main channel 104. Trapped gas 112 at the first temperature remains in the side chamber 108 and does not impede the fluid 111 in the main channel 104. FIG. 4c illustrates the reversible micro-valve device 102 at a second temperature in which the trapped gas 112 expands into the passage 106 and into a portion of the main channel 104 so as to fill an entire cross-sectional area and thus block fluid flow (indicated by black X's). FIG. 4d illustrates the reversible micro-valve device 102 returned to the first temperature which causes the trapped gas 112 to return to the side chamber 108 and thus allow flow 111 to resume in the main channel 104. In an example, the volume of the side chamber 108 is at least in part based on a change of temperature within the side chamber 108.

Figure 5A:
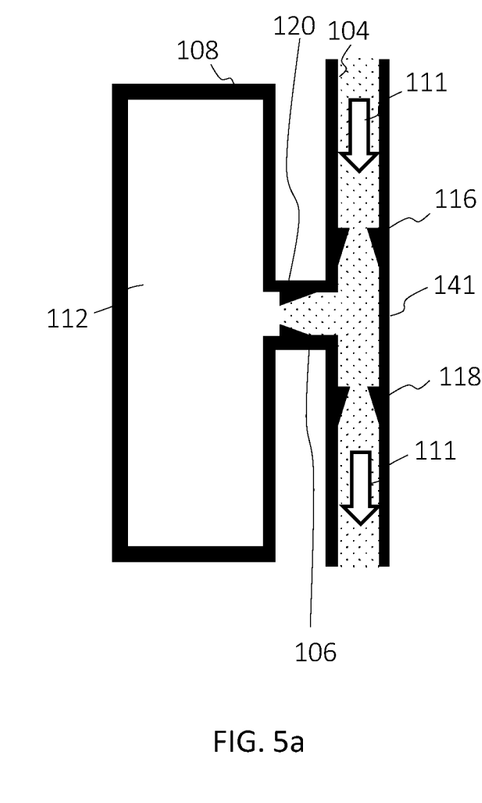
FIG. 5a is a reversible micro-valve device, consistent with the disclosed implementations.
Figure 5B:
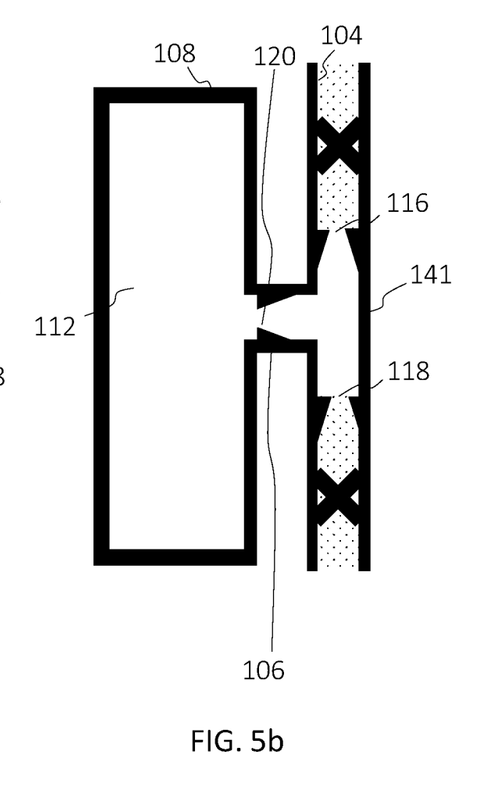
FIG. 5b is a reversible micro-valve device, consistent with the disclosed implementations.

FIG. 4b and FIG. 4d are replicated and enlarged as FIG. 5a and FIG. 5b, respectively. As depicted in FIGS. 5a and 5B, the side chamber 108 is coupled to the main channel 104 by the passage 106. The valve 141 includes the volume of the passage 106 and a portion of the main channel 104 into which the trapped gas 112 expands. In an example, the passage 106 directs gas expansion perpendicular to the flow through the main channel 104. The valve 141 shown is T-shaped with the main channel 104 perpendicular to the passage 106. In another example, the valve 141 is O-shaped. In another example, the main channel 104 is slanted, or otherwise angled less than 90 degrees to the passage 120. The internal width or cross-sectional area of the side chamber 108 may be less than, equal to, or greater than, an internal width or cross-sectional area of the main channel 104. Also, the internal width or cross-sectional area of the passage 120 may be equal to or less than an internal width or cross-sectional area of the main channel 104. The cross-sectional area is referenced with respect to the length of the side chamber 108, passage 120, and main channel 104. The valve 141 may include side chambers 108 other shapes, such as circle, rectangle, square, or other shapes.

Capillary breaks are referenced, including side capillary break 120, top capillary break 116, and bottom capillary break 118. A capillary break is a structure, or structural definition, within the main channel 104 and passage 106 that provides a decrease in diameter. As shown, sloped or tapered walls create a decrease in diameter sufficient to stop capillary action. In another example, a capillary break may be defined by a hydrophobic material or a non-porous material (such as glass, plastic, or metal). A capillary break helps stabilize the menisci at a fixed location in both open and closed states. The capillary break further provides margins for geometrical variations and temperature control.

Note that each capillary break, including top capillary break 116, bottom capillary break 118, and side capillary break 120, tapers outward from a narrowed diameter in the direction of flow. In some examples, the passage 106 further includes an indention or recess to narrow the diameter of the passage channel and then taper outward in providing the side capillary break 120.

When a fluid 111 is introduced into the main channel 104, the fluid 111 completely fills the main channel 104 and traps a gas 112, such as air, in the side chamber 108. The capillary break 120 in the connecting passage 106 stabilizes the meniscus at a defined position. At this point, fluid 111 flows in the main channel 104 unrestricted under capillary or external pressure sources. Particularly, the two capillary breaks 116 and 118 in the main channel 104 do not restrict fluid 111 in the direction of flow. In such a situation, the reversible micro-valve device 102 is in an open state.

Next, the temperature of the trapped gas 112 within the side chamber 108 is raised. The increase in temperature causes the trapped air 112 to expand into a portion of the main channel 104 and block the flow. The expansion encompasses the full width of the main channel 104 along with a depth to fill the portion of the main channel 104. The expanded trapped air 112 is shown clearly in FIG. 5b. The two capillary breaks 116 and 118 in the main channel 104 help stabilize the menisci at fixed locations and provide margins for geometrical variations and temperature control. In this example, the reversible micro-valve device 102 is in a closed state. The passage 106 and the portion of the main channel 104 into which the expanded trapped gas 112 expands, as caused by the temperature, is referred to herein as the valve 141.

Next, the temperature is lowered again and the expanded trapped gas 112 contracts. As the bubble of trapped gas 112 is pulled back into the side chamber 108, the original state of the trapped gas 112 is restored and the fluid 111 flow in the main channel 104 resumes. The reversible micro-valve device 102 is open again. The process can be repeated as many times as desired for system operation.

Note that the trapped gas 112 may be any type of gas, such as air, sterile air, oxygen, hydrogen, carbon dioxide, inert gas (e.g., nitrogen, helium, argon, etc.), or a combination thereof. Also, a fluid 111 in the main channel 104 may be selected based on consistency with the rest of the microfluidic system (e.g., chemical stability, viscosity, surface tension, compressibility, and other properties) which can be present in the main channel 104 and controlled by this type of valve 141. Note that at least one feature of the reversible micro-valve device 102 may be based on specific properties of a given fluid 111. For example, gaps of the capillary breaks 116, 118, 120 may depend on the surface tension of the fluid 111 and its contact angle with the main channel 104 walls.

The reversible micro-valve device 102 may have a particular ratio of work volume to valve volumes. The work volume is considered to be the volume of the side chamber 108. The valve volume is considered to be the volume of the valve 141. As described above, the reversible micro-valve device 102 can be deemed to have at least two states. In the open state, the trapped gas 112 occupies the work volume, or in other words, the volume of the side chamber 108. In the closed state, the expanded trapped gas 112 occupies the work volume and the valve volume, or in other words, the volume of the side chamber 108, the passage 106, and the portion of the main channel 104 into which the trapped gas expands. The work volume and valve volume are related by temperature. From the ideal gas law, $$\frac{V_w + V_v}{V_w} = \frac{T_2}{T_1}$$

from where $$V_w = V_v \frac{T_1}{T_2 - T_1},$$

where $T_1$ and $T_2$ are absolute temperatures of the open and closed states, respectively. In one specific example, the work volume to valve volume ratio ($V_w/V_v$) is approximately 10 which implies $(T_2-T_1)/T_1=0.1$. Such a valve can be operated, for example, between $T_1=310K$ ($T_1=37$ C) and $T_2=341K$ ($T_2=68$ C). For these operating conditions, the valve area may be 30×200 µm² and the work area may be 300×200 µm².

In another specific example, the work volume to valve volume ratio ($V_w/V_v$) is approximately 30 which implies $(T_2-T_1)/T_1=0.03$. Such a valve can be operated at smaller temperature differences, for example, between $T_1=310K$ ($T_1=37$ C) and $T_2=320K$ ($T_2=47$ C). For these operating conditions, the valve area may be 30×200 µm² and the work area may be 900×200 µm². Note that a higher volume ratio will require a larger area for the side chamber on the chip, however, the valve 141 will still operate accordingly.

In another specific example, the work volume to valve volume ratio ($V_w/V_v$) is between 5 and 50. For each specific ($V_w/V_v$), the open and closed states have operating temperatures that may be determined from the ideal gas law.

While particular reference is made to particular examples with specific dimensions, the above is provided as examples of the dimensions of the work volume, the valve volume, and the work temperatures.

Figure 6A:
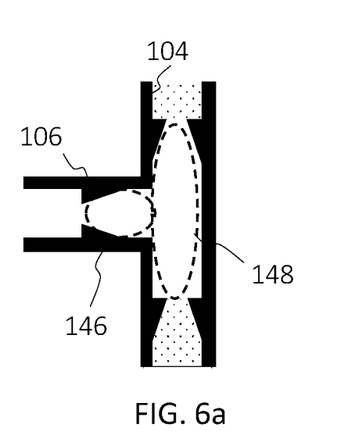
FIG. 6a is a reversible micro-valve device, consistent with the disclosed implementations.

Changing the valve internal volume, or in other words, the internal space within the valve 141, may affect the microdevice 102 operation. FIG. 6a shows a valve 141 (see FIGS. 5a and 5b) divided into two spaces, the passage space 146 and the main channel space 148, or the portion into which trapped gas expands within the main channel 104.

Figure 6B:
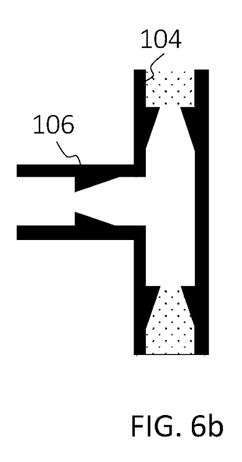
FIG. 6b is a reversible micro-valve device, consistent with the disclosed implementations.

A "full volume" reversible micro-valve device 102 is shown in FIG. 6b where internal valve widths of the passage space 146 and portion space 148 are equal to the main channel 104 width.

Figure 6C:
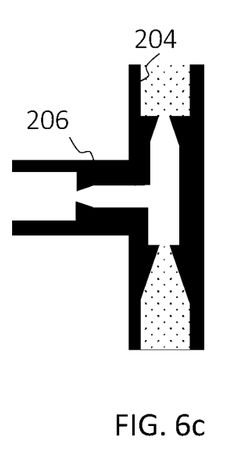
FIG. 6c is a reversible micro-valve device, consistent with the disclosed implementations.

A "small volume" reversible micro-valve device 102 is shown in FIG. 6c, where the internal valve widths of the passage space 146 and portion space 148 have less internal width than the main channel 104 width. The "small volume" reversible micro-valve device 102 decreases the work volume and the $T_2-T_1$ used for valve operation. Moreover, narrow channels and capillary breaks increase the holding pressure of the valve. However, narrow channels increase the fluidic resistance of the main channel 104 and decrease the flow rate. In an example, a small volume valve 141 is used to minimize the side chamber 108 volume for space constraints. In another example, a small volume valve 141 is used to minimize the closed state temperature and thus reduce evaporation or chemical instability. A full volume valve 141 may be desired when controlling a high-viscosity fluid, such as whole blood. Because of the high viscosity, narrow sections of the valve 141 increase the fluidic resistance and reduce flow rate in the open state. Accordingly, the main channel 104 to receive a high viscosity fluid has a wide width, or in other words, a width to accommodate the viscosity of blood or other high-viscosity fluid, in the open state.

In general, the valve 141 internal shape is a multi-dimensional object which is adaptable to the environment of a particular device. Note that internal valve widths between the passage 106 and the main channel 104 may be the same or different with respect to each other. In an example, the passage 106 has a smaller internal width than the main channel 104. In another example, the main channel 104 has a smaller internal width than the passage 106.

Figure 7A:
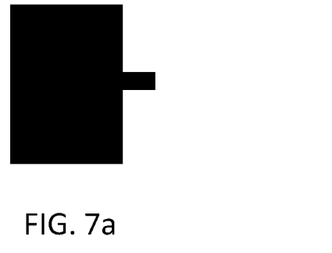
FIG. 7a is a top view of a side chamber, consistent with the disclosed implementations.
Figure 7B:
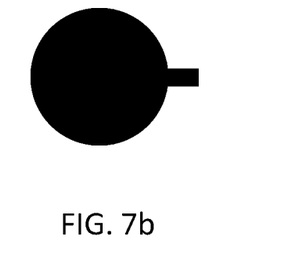
FIG. 7b is a top view of a side chamber, consistent with the disclosed implementations.
Figure 7C:
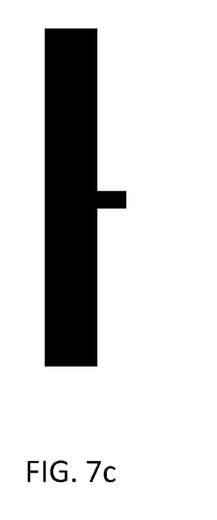
FIG. 7c is a top view of a side chamber, consistent with the disclosed implementations.
Figure 7D:
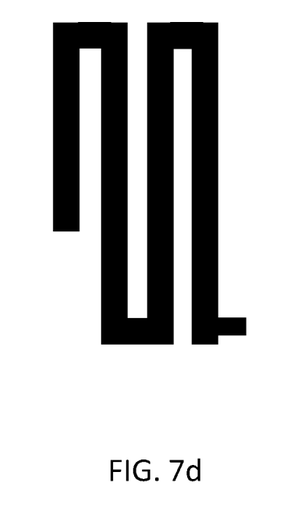
FIG. 7d is a top view of a side chamber, consistent with the disclosed implementations.
Figure 7E:
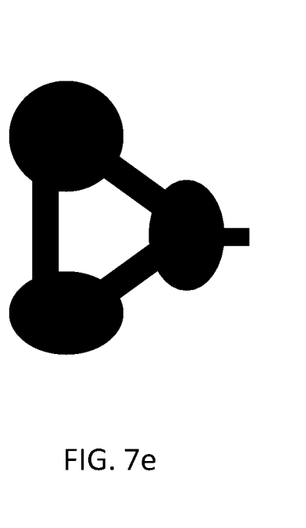
FIG. 7e is a top view of a side chamber, consistent with the disclosed implementations.
Figure 7F:
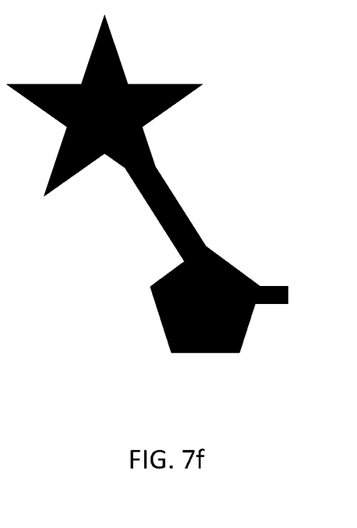
FIG. 7f is a top view of a side chamber, consistent with the disclosed implementations.

The reversible micro-valve device 102 enables a wide flexibility in the shapes of the side chamber 108. The side chamber 108 may include a volumetric shape that may encompass unused space within a device of a thermo-pneumatic micro-valve system 200. Since air fills up any shape, it is the total volume of the side chamber 108 that impacts the operation of the valve 141, and not the shape. FIGS. 7a, 7b, 7c, 7d, 7e, and 7f show examples of different side chamber 108 shapes that may be used in the reversible micro-valve device 102 of the present specification. FIG. 7a shows a rectangle shape. FIG. 7b shows a circle shape. FIG. 7c shows a tall narrow rectangle shape. FIG. 7d shows a serpentine shape. FIG. 7e shows a series of connected circle and oval shapes. FIG. 7f shows a star shape connected to a pentagon shape. While FIGS. 7a-7f depict various particular shapes, other shapes may be implemented in accordance with the principles described herein.

The side chambers 108 can assume many different shapes to fit between other fluidic features, thereby filling up unused area and reducing the overall device dimensions. This allows for many different types of configurations. For example, the serpentine shape can fill elongated spaces by winding around various channels. In another example, the star shape may fill corners and voids. As such, the reversible micro-valve device 102 may be manufactured to be smaller due to less space required for a side chamber 108. Also, existing devices may be left unchanged when implementing the principles discussed herein.

In an example, a single side chamber 108 may control multiple valves 141. For example, the main channel 104 may include at least two valves 141 that each are communicatively attached to a single side chamber 108, and flow going through the two valves 141 is stopped as controlled by the trapped gas in the side chamber.

Figure 8:
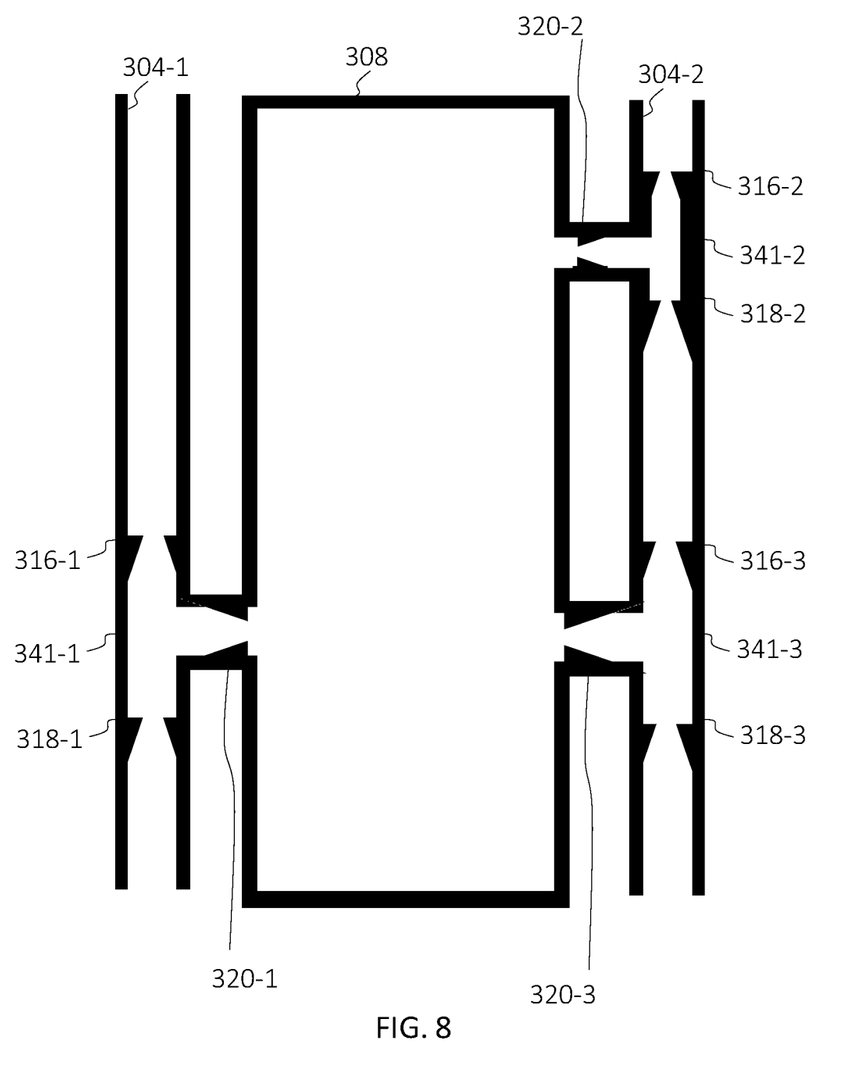
FIG. 8 is a reversible micro-valve device, consistent with the disclosed implementations.

As shown in FIG. 8, side chamber 308 is attached to a first main channel 304-1 and a second main channel 304-2 on either side of the side chamber 308. The first main channel 304-1 includes a valve 341-1. The second main channel 304-2 includes a first valve 341-2 and a second valve 341-3.

The respective valve volumes and capillary breaks may be engineered such that all valves close at the same temperature. In another example, the respective valve volumes and capillary breaks may close at different temperatures. In the latter case, valving sequences may be implemented with selected valves that open or close when the temperature reaches a certain value while the other valves do not change their states.

Particularly, the largest valve volumes shown include valve 341-3 with top capillary break 316-3, bottom capillary break 318-3, and side capillary break 320-3, and valve 341-1 with top capillary break 316-1, bottom capillary break 318-1, and side capillary break 320-1. The smallest valve volume is provided by valve 341-2 with top capillary break 316-2, bottom capillary break 318-2, and side capillary break 320-2. In this example, the smallest valve volume may reach a closed state first with a given temperature, and this may be used to achieve a faster flow block.

If more than one valve 341-2, -3 is connected to channel 304-2, a portion of the main channel 304-2 between the valves 341-2, -3 is fluidically isolated from the rest of the system once both valves 141 are closed. Doing so may eliminate mass exchange and inter-diffusion between the isolated volume and the rest of the main channel 104. In such an example, more than one valve 141 and the volume there between can be used as a reaction zone in which a chemical or biological reaction takes place.

Priming may occur, for example by a large inlet port, on which a liquid can be hand-pipetted or printed by a printer. In another example, a system of microfluidic channels may be fabricated on a silicon substrate through which macroscopic slots are machined. A liquid may be delivered on the back of the die by pipetting or free flow from a microscopic container. In another example, a liquid can be stored inside a blister pack that is punctured upon insertion into an instrument. The liquid is squeezed toward either an input port or a through silicon slot and priming proceeds by capillary action. While particular examples of fluid priming have been presented, other priming techniques may be implemented in accordance with the principles described herein.

When a side chamber 308 controls valves in multiple main channels 304-1, 2, priming is done with care. Specifically, once the first main channel 304-1 is primed, the capillary breaks 316-1, 318-1, 320-1 in will be able to hold a fluid for a finite time before giving in. Therefore, the other main channels 304-2 may be primed before the capillary breaks 316-1, 318-1, 320-1 fail to fully trap air inside the side chamber 308.

In another example, more than one side chamber 108 is fabricated on one chip. The side chambers may differ in work volumes, shapes, and the number of valves they control. Using all the control parameters described above, valving patterns and sequences can be implemented which depend on just the overall die temperature.

In an example, the valving patterns and sequences are used in microfluidic micro-reactors, where new compounds are synthesized. Such micro-reactors may rely on complex fluid flow with many valves. Multiple chambers and multiple channels are two different elements that enable these complex fluid flow.

Valving patterns and sequences, as well as other purposes, may be accomplished by creating temperature zones from a plurality of heating devices 210, such as built-in heaters and heat sinks. In an example, a temperature difference on the order of 10-50 C can be created by built-in heaters and heat sinks. Valves positioned in the different temperature zones may be operated independently. For example, if a system consists of two subsystems A and B, and the temperature in A and B is controlled independently with a window of 20 C, then the valves in zone A may be closed at a relatively high temperature while the valves in zone B may stay open at a relatively lower temperature. Thus, independent temperature zones that are organized on a single chip provide flexibility with valving.

In addition to multiple side chambers and multiple valves, further examples include diverting at least a portion of fluid flow away from the main channel 104 via an off-branch channel in fluid communication with the main channel 104 and passage 120 and which stops when the trapped gas 112-1 in the side chamber 108 expands.

In summary, the reversible micro-valve device 102 and systems 100 that implement such a micro-valve device 102 are reversible in nature, in that flow can be turned on and off. The micro-valve device 102 allows flexibility with placement, shape, and working volumes to provide ease in manufacturing. Furthermore, the reversible micro-valve device 102 enables fluidically isolated volumes that can be used to control flow in injection printing, micro-chemistry, biological testing, synthesis of chemicals, and bioreactors. Particular examples include sample preparation for polymerase chain reaction (PCR) and on-chip DNA synthesis.

The preceding description has been presented to illustrate and describe examples of the principles described. This description is not intended to be exhaustive or to limit these principles to any precise form disclosed. Many modifications and variations are possible in light of the above teaching.

What is claimed is:

1. A reversible micro-valve device, comprising:
   a main channel comprising a pair of capillary breaks:
   a passage comprising an opening at an end of the passage into the main channel, the opening between the pair of capillary breaks;
   a side chamber to house a volume of trapped gas, the side chamber communicably attached to the passage to control flow along the main channel, the side chamber to be larger in volume than the main channel to which the trapped gas expands, wherein the micro-valve device includes each of the following two states at different points in time:
   an open state in which the main channel is open and flow proceeds through the main channel, and
   a closed state in which the trapped gas within the side chamber is to expand across the passage and the full width of the main channel to block the flow in the main channel.

2. The reversible micro-valve device of claim 1, wherein the main channel and passage form a T-shape with the main channel perpendicular to the passage.

3. The reversible micro-valve device of claim 1, further comprising at least one capillary break in the passage.

4. The reversible micro-valve device of claim 1, further comprising a heating device communicably attached to the side chamber.

5. The reversible micro-valve device of claim 1, wherein the main channel includes at least two valves that are each communicatively attached to the side chamber, flow going through each passage of each of the at least two valves and being stopped in each passage as controlled by the trapped gas in the side chamber.

6. The reversible micro-valve device of claim 1, wherein the passage directs gas expansion perpendicular to the flow through the main channel.

7. The reversible micro-valve device of claim 1, wherein the trapped gas in the side chamber is air.

8. The reversible micro-valve device of claim 1, wherein an internal valve width is less than an internal width of the main channel width.

9. The reversible micro-valve device of claim 1, further comprising:
   a controller to operate to:
   increase a temperature of the trapped gas, the increase causing the trapped gas to expand across the passage and the full width of the main channel to block the flow in the main channel; and subsequent to the increase of the temperature, decrease the temperature of the trapped gas, the decrease causing the trapped gas to retract back into the side chamber to cause the flow to resume.

10. The reversible micro-valve device of claim 1, wherein the pair of capillaries each comprise a narrowed diameter of the main passage and taper outward in a direction of the flow.

11. A reversible micro-valve system, comprising:
a plurality of channels, each of the plurality of channels comprising a pair of capillary breaks;
a side chamber to house a volume of trapped gas, the side chamber communicably attached by passages to respective channels of the plurality of channels to control flow therein, the side chamber to be larger in volume than each channel of the plurality of channels into which the trapped gas expands through an opening at an end of a passage of the passages into a channel of the plurality of channels, each opening between a different pair of capillary breaks; and
a heating device communicably attached to the side chamber, wherein the micro-valve device includes each of the following two states at different points in time:
an open state in which the plurality of channels are open and flow proceeds through the plurality of channels, and
a closed state in which the trapped gas within the side chamber is to expand across the passage and the full width of the main channel to block the flow in the plurality of channels.

12. The reversible micro-valve system of claim 11, wherein a different temperature is used to activate different valves of the side chamber for the respective plurality of channels.

13. The reversible micro-valve system of claim 11, wherein an internal width of the side chamber is equal to or less than an internal width of each channel of the plurality of channels.

14. The reversible micro-valve system of claim 11, wherein the side chamber includes a volumetric shape that is to encompass at least partially unused space within a device that incorporates the thermo-pneumatic micro-valve system.

15. A method, comprising:
applying a first temperature to a side chamber of a reversible micro-valve device that is in fluid communication with a main channel comprising a pair of capillary breaks, wherein when the first temperature is applied, flow proceeds through the main channel, wherein the side chamber contains trapped gas, the volume of the side chamber being larger than the volume of the main channel; and
applying, to the side chamber, a second temperature that is higher than the first temperature, the second temperature to cause the trapped gas within the side chamber to expand across the full width of the main channel through an opening at an end of a passage into the main channel and between the pair of capillary breaks to block the flow of fluid through the main channel.

16. The method of claim 15, further comprising diverting at least a portion of fluid flow away from the main channel via an off-branch channel in fluid communication with the main channel and passage and which stops when the trapped gas in the side chamber expands.

* * * * *